United States Patent [19]
Tso et al.

[11] Patent Number: 6,088,803
[45] Date of Patent: Jul. 11, 2000

[54] SYSTEM FOR VIRUS-CHECKING NETWORK DATA DURING DOWNLOAD TO A CLIENT DEVICE

[75] Inventors: Michael Man-Hak Tso; Bikram Singh Bakshi, both of Hillsboro, Oreg.

[73] Assignee: Intel Corporation, Santa Clara, Calif.

[21] Appl. No.: 09/000,778

[22] Filed: Dec. 30, 1997

Related U.S. Application Data

[60] Provisional application No. 60/041,002, Mar. 27, 1997.

[51] Int. Cl.[7] .................................................. G06F 11/34
[52] U.S. Cl. .......................... 713/201; 713/200; 713/201; 709/203; 709/219; 380/4
[58] Field of Search ................................. 380/4; 713/200, 713/201; 709/203, 219; 714/38

[56] References Cited

U.S. PATENT DOCUMENTS

| | | | |
|---|---|---|---|
| 5,319,776 | 6/1994 | Hile | 713/200 |
| 5,373,375 | 12/1994 | Weldy | 358/523 |
| 5,517,612 | 5/1996 | Dwin et al. | 395/166 |
| 5,544,320 | 8/1996 | Konrad | 395/200.09 |
| 5,623,600 | 4/1997 | Ji | 713/201 |
| 5,673,322 | 9/1997 | Pepe et al. | 380/49 |
| 5,684,969 | 11/1997 | Ishida | 395/342 |
| 5,701,451 | 12/1997 | Rogers et al. | 395/600 |
| 5,706,434 | 1/1998 | Kremen et al. | 395/200.09 |
| 5,724,556 | 3/1998 | Souder et al. | 395/500 |
| 5,727,159 | 3/1998 | Kikinis | 395/200.76 |
| 5,742,905 | 4/1998 | Pepe et al. | 455/461 |
| 5,768,510 | 6/1998 | Gish | 395/200.33 |
| 5,805,735 | 9/1998 | Chen et al. | 382/239 |
| 5,832,208 | 11/1998 | Chen | 713/201 |
| 5,889,943 | 3/1999 | Ji | 713/201 |
| 5,896,506 | 4/1999 | Ali | 709/213 |
| 5,918,008 | 6/1999 | Togawa | 713/201 |

OTHER PUBLICATIONS

Armando Fox and Eric A. Brewer, "Reducing WWW Latency and Bandwidth Requirements by Real–Time Distillation," Fifth International World Wide Web Conference, May 6–10, 1996.

Armando Fox et al., Adapting to Network and Client Variability via On–Demand Dynamic Distillation, University of Cal. at Berkeley, Sep. 1996.

"Understanding Symantec's Anti–virus Strategy for Internet Gateways" Author unknown, Feb. 1997, The Symantec Enterprise Papers, vol. XXX.

"File Missing after Downlaod from Web with Netscape", Author Unknown, Feb. 1997, Symantec Technical Support Knowledge Base.

*Primary Examiner*—Robert W. Beausoliel, Jr.
*Assistant Examiner*—Bryce Bonzo
*Attorney, Agent, or Firm*—Kenyon & Kenyon

[57] ABSTRACT

A system for virus checking a data object to be downloaded to a client device is implemented in a method including the steps of retrieving a data object to be downloaded, scanning the data object for a computer virus, and downloading the data object to the client device if no computer virus is detected.

21 Claims, 5 Drawing Sheets

FIG.5 though the user does no
SYSTEM FOR VIRUS-CHECKING NETWORK DATA DURING DOWNLOAD TO A CLIENT DEVICE This application claims the benefit of the identically-titled U.S. Provisional Application No. 60/041,002, filed Mar. 27, 1997 by Michael M. Tso et al. and assigned to Intel Corporation, the disclosure of which is expressly incorporated herein by reference.

BACKGROUND OF THE INVENTION

1. Field of the Invention

The present invention relates generally to the field of data communications for personal computers (PCs), and in particular to a system for virus checking content to be downloaded to a network client.

2. Related Art

The Internet is quickly becoming the preferred data communications medium for a broad class of computer users ranging from private individuals to large multi-national corporations. Such users now routinely employ the Internet to access information, distribute information, correspond electronically, and even conduct personal conferencing. An ever-growing number of individuals, organizations and businesses have established a presence on the Internet through "Web pages" on the World-Wide Web ("the Web").

As the popularity of the Internet has grown, so too have concerns about breaches in system integrity, such as computer viruses, which may be introduced by data downloaded from the largely-unregulated network. Existing virus scanning utilities typically are installed on end-user systems, but this approach presents several disadvantages. First and foremost, infected files may still reach a user's system (for example, downloaded from the network or copied from an external storage device) without the user's knowledge. The infected data may reside undetected on the user's system for a long period of time (for example, until the next time the user does a complete system scan, which many users do no more frequently than weekly, if at all). In the meantime, the user may inadvertently pass the infected file to other users. In addition, users may forget to leave virus checking software running, thereby providing infected data with an opportunity to infiltrate their system. Even a user who is diligent about periodically scanning his or her system may not be entirely safe from viruses, since the virus checking software may be outdated (that is, lacking the latest known virus pattern files).

Many of the disadvantages of existing end-user virus checking approaches can be avoided by preventing infected files from ever being downloaded to an end-user's machine in the first place. Accordingly, there is a need for a virus checking system capable of efficiently scanning network content for viruses prior to downloading such content to end-users.

SUMMARY OF THE INVENTION

According to an embodiment of the present invention, a method for virus checking a data object to be downloaded to a client device is provided. Upon retrieval of a data object to be downloaded, the data object is scanned for a computer virus. If no computer virus is detected, the data object is downloaded to the client device.

DETAILED DESCRIPTION

Figure 1:
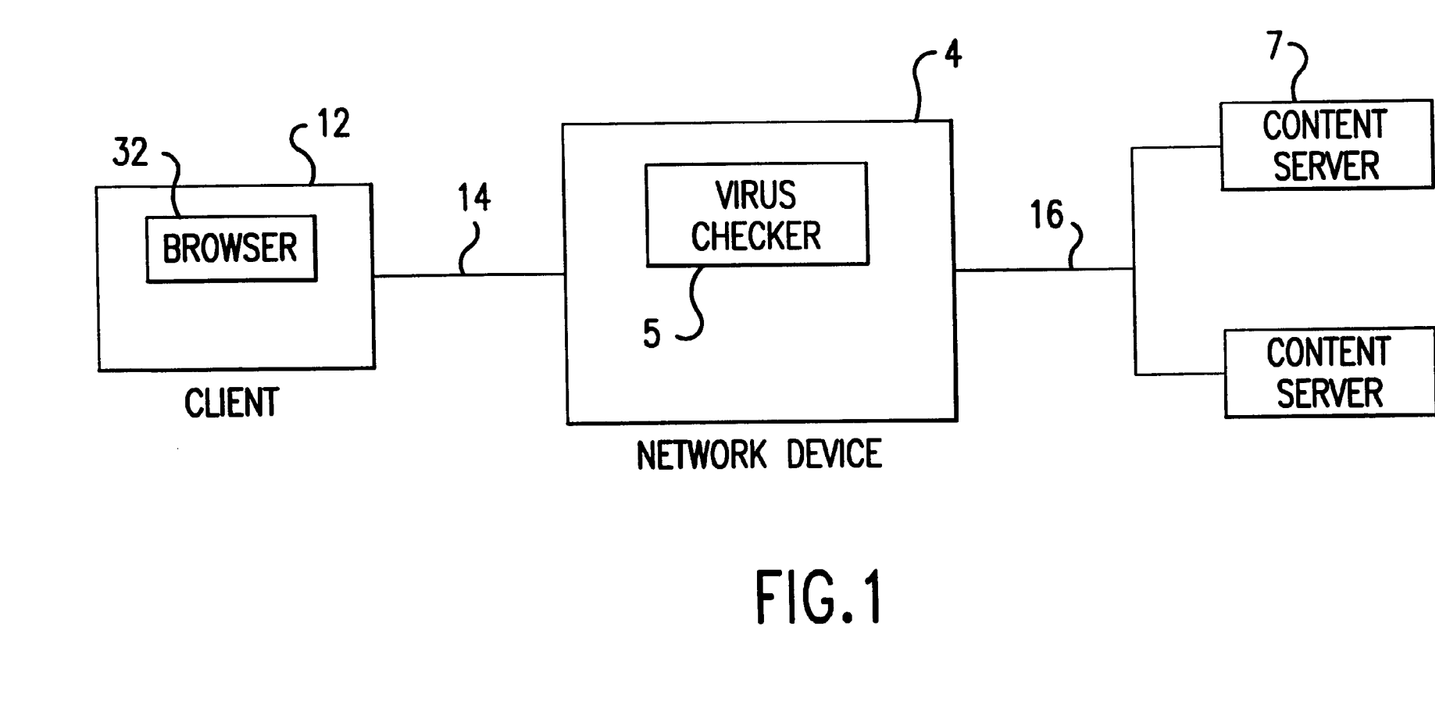
FIG. 1 is a schematic diagram illustrating a network device configured according to an embodiment of the present invention.

Embodiments of the present invention are directed to a system for virus checking network data to be downloaded to a client device, such as data retrieved from an Internet content server in response to a browser request. With reference to FIG. 1, according to a first embodiment of the present invention a client device 12 may access a plurality of content servers 7 through a network device 4. Content servers 7 may reside, for example, on the Internet; however, the present invention is not limited to any particular network or networking environment.

In this particular embodiment, network device 4 is a network proxy, and may be implemented, for example, as a content server or other stand-alone computer coupled to an ISP's (Internet Service Provider's) network, a corporate network, or anywhere on the Internet. Network device 4 is capable of providing multiple client devices 12 (only one is illustrated) with access to content resident on computers coupled to the Internet. In accordance with other embodiments, network device 4 may comprise, for example, a router, a networking stack, or any other device capable of performing the functionality described herein.

In this embodiment, network device 4 includes a virus checker 5. Virus checker 5 may comprise any standard, off-the-shelf virus scanning application. Such applications typically detect viruses through pattern matching or detection of certain run-time behaviors associated with known viruses. The bit patterns and/or run time behaviors for which virus checker 5 scans are typically extensible and stored in configuration files accessible by virus checker 5.

Figure 5:
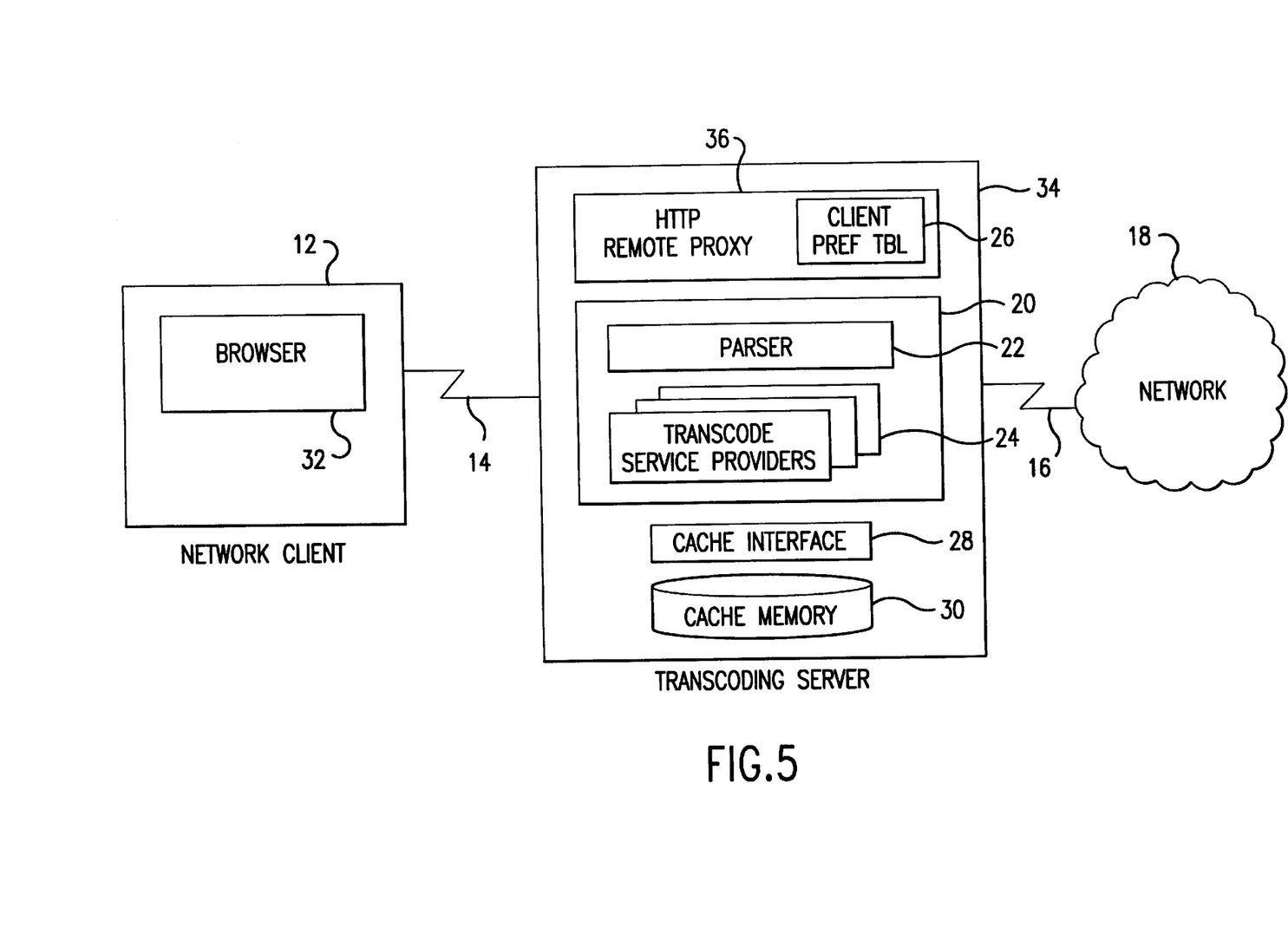
FIG. 5 is a schematic diagram illustrating a system for transcoding network content to which embodiments of the present invention may be directed.

Virus checker 5 may be implemented as a software module installed on network device 4 or on a separate device (not shown) coupled to network device 4. Virus checker 5 may alternatively be implemented in a device configured to provide transcoding services to one or more client devices. FIG. 5 illustrates a system for transcoding network content to which embodiments of the present invention may be applied, as described further below.

Figure 2:
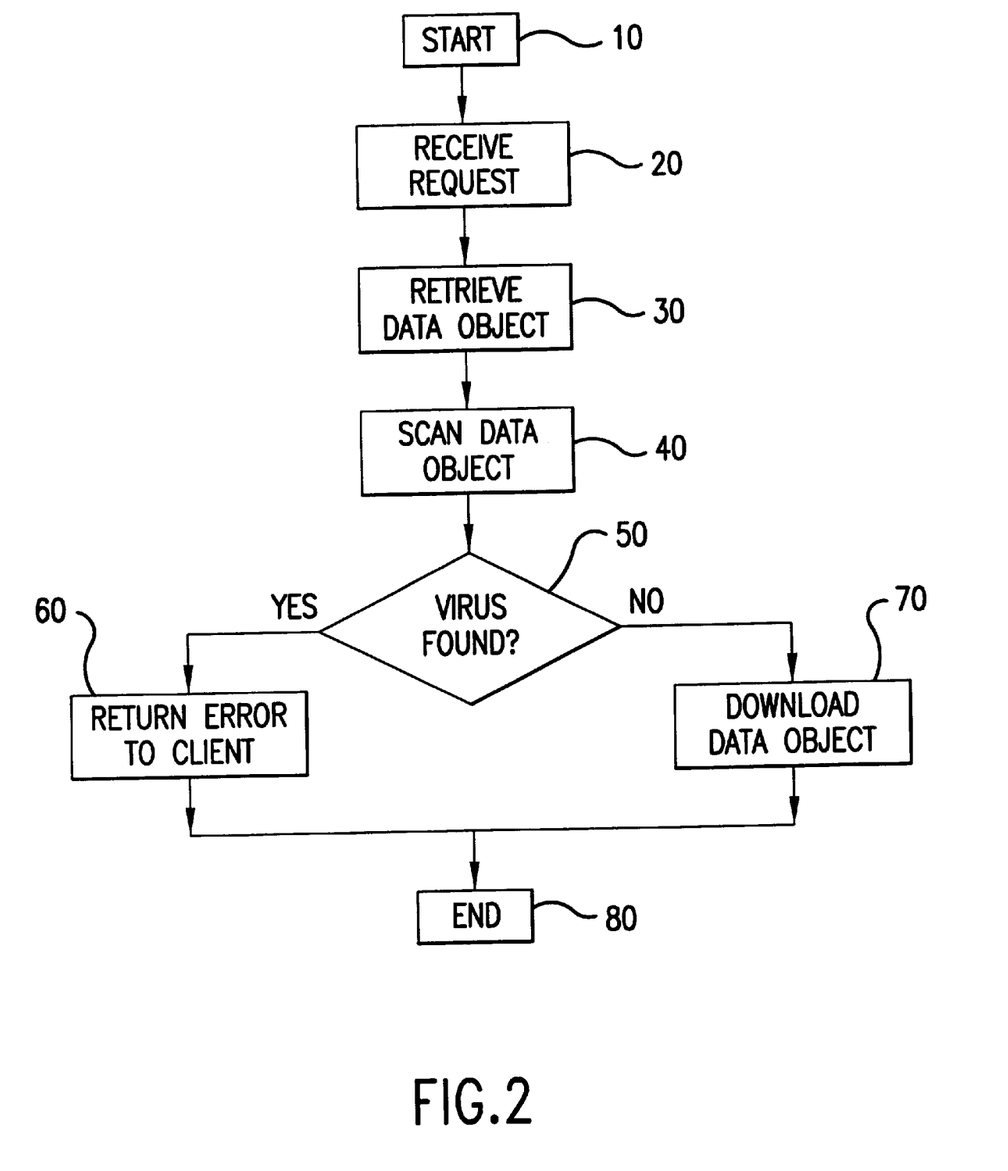
FIG. 2 is a flow diagram illustrating a method for virus checking network data according to an embodiment of the present invention.

FIG. 2 provides a flow diagram describing a method for virus checking network data according to an embodiment of the present invention. The illustrated method may be implemented, for example, using a system such as those illustrated in FIG. 1 and FIG. 5. For purposes of illustration, the following description makes reference to the structural features illustrated in FIG. 1, but the described method may be implemented using other structural embodiments.

As shown in FIG. 2, processing begins upon receipt of a request for a data object from client device 1 (Step 20). Such a request may comprise, for example, an HTML (HyperText Markup Language) request specifying a particular URL (Uniform Resource Locator) associated with a Web page resident on content server 7. Network device 4 then retrieves the requested data object from content server 7, generally in the form of an HTML file (Step 30). Once the file is completely received, network device 4 invokes virus checker 5, which in turn performs its preconfigured virus scan processing with the requested file as input (Step 40). If the requested file does not contain a virus, network device 4 transmits the file to client device 1 (Step 70); if a virus is detected, the file will not be sent and, optionally, network device 4 transmits an appropriate error/warning message to client device 1 and/or content server 7 (Step 60).

Figure 3:
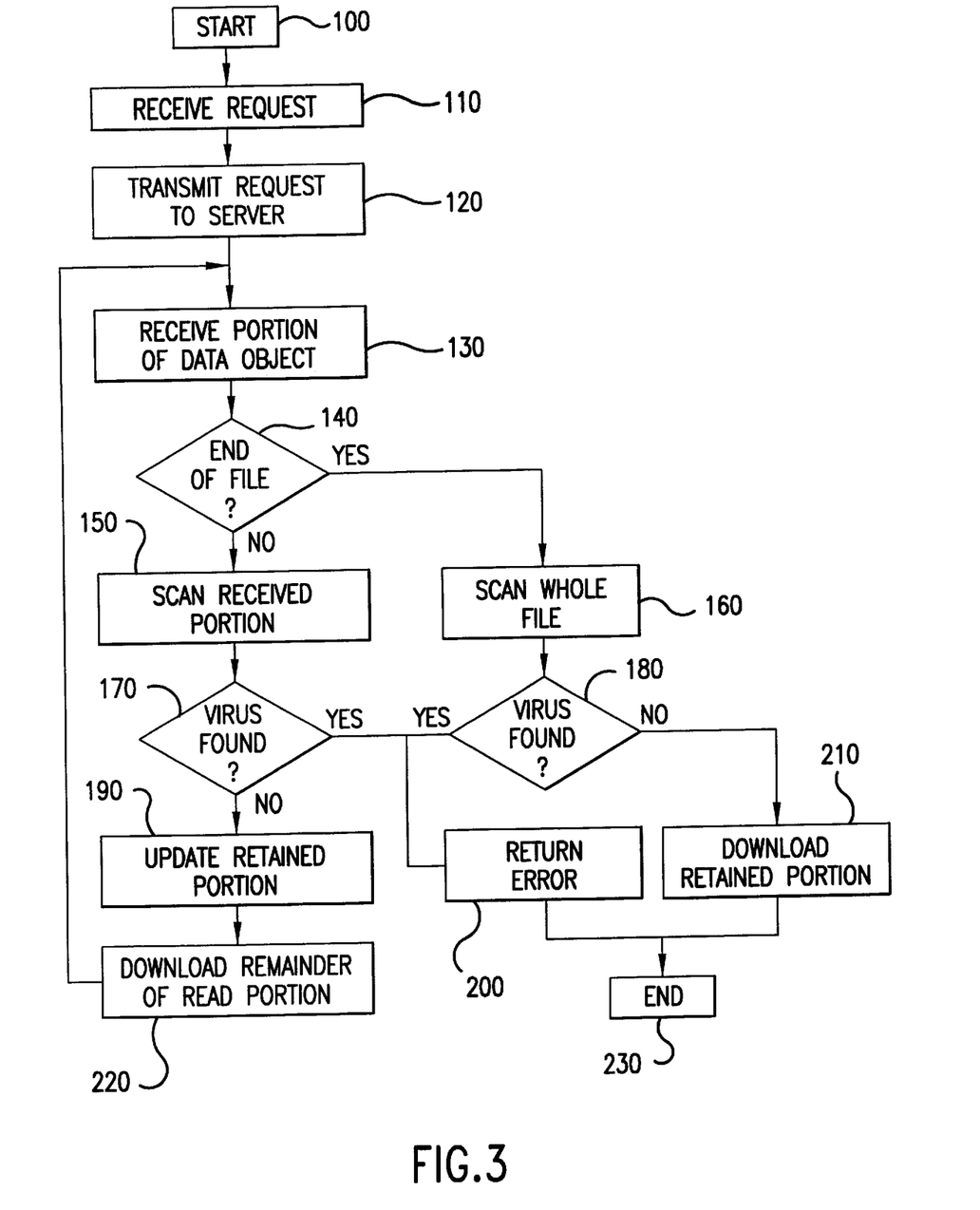
FIG. 3 is a flow diagram illustrating an alternate method for virus checking network data according to an embodiment of the present invention.

In an alternate embodiment, illustrated in FIG. 3, the virus checking method may implemented in a manner intended to maximize the efficient transfer of data from content server 7 to client device 12. In a typical network transaction, content server 7 will transmit a requested data object as a series of contiguous portions. In contrast to the embodiment of FIG. 2, network device 4 generally transmits those portions to client device 1 as soon as they are received from content server 7, rather than waiting for the entire data object to be received. This mode of operation is similar to that used in existing non-virus checking proxies (also known as pass-through proxies), and is commonly referred to as "streaming." Here, however, network device 4 behaves differently from such known proxies in that it always withholds a portion (or a segment of a portion) of the requested file most-recently received from content server 7, and does not transmit that withheld portion until at least another similarly-sized portion of the requested file is received. As explained further below, this retained portion of the requested file enables network device 4 to ensure that a virus-infected file will not reach client device 1 in its entirety. The size of the retained portion may be file-type specific, but should be sufficient to ensure that client device 1, and particularly browser 32, will interpret the requested file as corrupt or incomplete if the retained portion is missing. For most file types, only the last few bytes need be withheld, although to be conservative it may be desirable to withhold as much as 1K bytes.

Referring to FIG. 3, as network device 4 is streaming the requested file to client device 12, it maintains a working copy of the transmitted portions (Steps 190, 220). Virus checker 5 performs virus checking (for example, using standard pattern scans) on the requested file as portions are received from content server 7, but again this processing does not delay the transfer of data to client device 12 (Step 150). If a virus is detected, network device 4 terminates both the transmission from content server 7 and the transmission to client device 1 (Steps 200, 210). Network device 4 may explicitly notify client device 1 that a virus was detected so that any previously-received portions of the requested file can be discarded, although in almost all existing file transfer applications, such as Web browsers and FTP (File Transfer Protocol) applications, an abnormal termination results in an automatic discard of any partially-transferred file.

Assuming virus checker 5 does not first detect a virus, it may optionally perform additional virus checking operations upon detecting the end of the file being transmitted by content server 7 (Steps 160). For example, some existing virus checking routines require an entire file. At this point, because network device 4 has retained a portion of the requested file, client device 12 will not have received the entire file. Once the final virus checking is complete, and assuming no virus is detected, network device 4 transmits the final withheld portion of the requested file to client device 12 (Step 210). On the other hand, if a virus is detected the withheld portion is not transmitted to client device 1 and the transmission is terminated (Step 200). Again, a suitable message or other notification may optionally be sent to content server 7 and/or client device 1.

While the final virus checking is occurring, it is important that the communications link 14 from network device 4 to client device 12, such as a TCP (Transmission Control Protocol) socket or other transmission virtual connection, remain active to avoid client device 12 discarding the partially-transferred file as incomplete. Some client devices, however, may be using a communications protocol (for example, TCP) or other software (for example, a browser) which includes a timeout mechanism whereby the communications link is automatically terminated if no activity between network device 4 and client device 12 is detected over a predetermined period of time. Such a timeout feature is typically implemented using a protocol stack timer resident on client device 12 which maintains a rolling estimate of the anticipated latency for network transactions. Since virus checking operations may be time consuming (at least more than the average network latency of a typical transaction), it may be desirable to "desensitize" the protocol stack timer by artificially delaying individual segments of the requested file before transmitting them to client device 12. This will prevent a timeout from occurring at the very end of the transaction when the complete file is being scanned at network device 4. In such an embodiment, the amount of delay to be introduced for each individual segment may be calculated as follows:

1. The time required to perform a virus scan on the complete file is first calculated. This is typically a function of the size of the file and the type of virus scan software used.
2. The time desensitization process is then incrementally applied such that the time delay injected for a segment progressively increases in each successive segment. The amount of injected delay for all but the last segment will thus be of the same order of magnitude as the time calculated in step "1." above.
3. This progressive desensitization will not only prime the client protocol stack timer for the potentially large final delay for scanning the entire file, but will also ensure that the round-trip estimates maintained by the client protocol stack are only gradually increased, thereby adding to the stability of the system.

The foregoing "streaming" embodiments are beneficial because they minimize idle time on the communications link 14 between network device 4 and client device 12 by keeping communications link 14 full of data for as long as network device 4 has data ready to send, thereby reducing any user-visible latency introduced by the virus checking service.

In another variation on the above-described embodiments, virus checker 5 may be configured to repair an infected file and complete the transmission to client device 12 instead of abandoning the entire transaction when a virus is found. Such repair functionality is well known in the field of computer virus checking. To implement this feature, the current transaction between network device 4 and client device 12 may first be nullified (and the portion of the requested file already received by client device 12 discarded), for example, by terminating the connection or by using an alternate predetermined protocol (if client device 12 is so-enabled) to exchange special data packets informing client device 12 that a repaired file will be sent. The repaired file may then be safely transmitted to client device 12. Using an approach of this type not only utilizes system and network resources most efficiently, but also adds more value to the virus checking operation by providing a disinfecting service.

Figure 4:
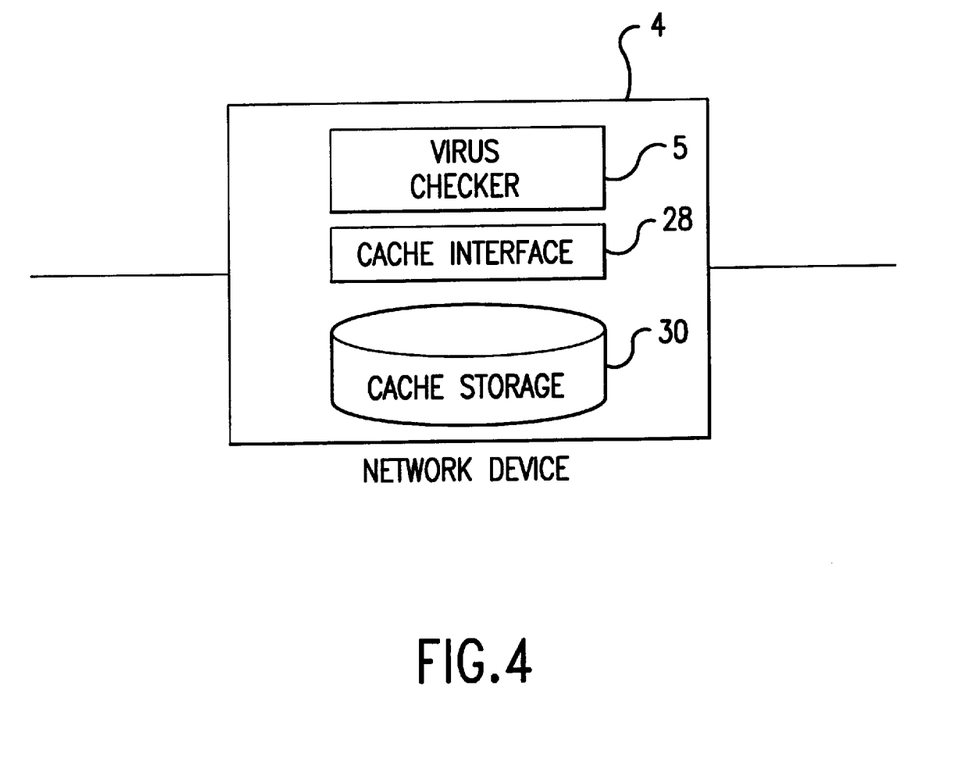
FIG. 4 is a schematic diagram illustrating a network device configured according to another embodiment of the present invention.

Referring now to FIG. 4, since virus checking can be a resource-intensive operation, checked files and/or results of checks may be advantageously stored in a cache storage 30 resident in, or coupled to, network device 4. Future requests for the same data object may then be serviced immediately without having to recheck the file. Network device 4 may also include a cache interface 28 configured to check whether a cached object has been updated on content server 7 since being cached, in which case network device 4 will retrieve the updated file and initiate virus checking as described above. If the virus repairing option is implemented, the repaired data object may be stored in cache storage 30.

As noted above, virus checker 5 will typically maintain a file or other data structure containing a collection of virus patterns used to scan data objects. When new virus patterns are received by virus checker 5, such as through a software update, network device 4 may have a large collection of already-examined files in cache storage 30. Given the availability of new virus patterns which have not been used to scan these cached files, network device 4 may simply expire all of the cached objects to avoid the possibility that a now-known virus was missed. Alternatively, according to another embodiment of the present invention, network device 4 may be configured to update the virus scan of the cached objects as detailed below.

According to this particular embodiment, objects in cache storage 30 may include a virus checking status indicator and a pattern version number. The pattern version number identifies which version of the virus pattern file was used to derive the virus checking status. If new virus patterns are communicated to network device 4 as an increment of the current version of the virus pattern file, virus checker 5 can maintain a list of deltas in its pattern file. Then, when a request for a cached object is received, virus checker 5 need only check the parts of the virus pattern file that have changed since the data object was cached. Assuming no virus is detected, the virus check status and pattern version number stored with the data object would be updated after the operation. In a variation on this embodiment, virus checker 5 may systematically check all of the cached objects to bring them up to date after new virus patterns are received.

By way of further illustration, and with reference again to FIG. 5, embodiments of the present invention such as those described above may be implemented, for example, as part of a system for dynamically transcoding network content. As illustrated, network client 12 communicates with an external network 18 through a transcoding server 34. Network client 12 includes a browser 32, such as the Netscape Navigator v.3.0 browser (although the invention is not limited in this respect), which manages the presentation of data to a user. In the illustrated arrangement, network client 12 is "non-enabled," meaning no specialized transcoding software is preloaded on network client 12. Network 18 may comprise, for example, the Internet. In this particular arrangement, network client 12 communicates requests for information to, and receives information from, transcoding server 34 over a client/server communications link 14. Transcoding server 34 in turn communicates with computers resident on network 18 through server/network communications link 16. The respective communications links 14, 16 may comprise any suitable communications media known in the art.

Transcoding server 34 may be configured to provide a wide variety of transcoding services to network client 12 and/or network devices, such as content servers, with which network client 12 communicates. In this context, the term "transcode" refers to virtually any type of addition, deletion or modification of data transmitted to or from network client 12 by or through transcoding server 34. Examples of such transcoding services include data compression, image scaling, and dynamic removal of predetermined content. In the context of the present invention, the provision of dynamic virus checking may be the only transcoding service provided to a particular client device, or may be only one of a variety of services.

As illustrated in FIG. 5, transcoding server 34 may include a transcoder 20 with a parser 22 and a plurality of transcode service providers 24. Parser 22 is configured to act upon data received by transcoder 20, such as a request for a network object generated by client device 12 or a reply to such a request provided by a content server or other device on network 18. In this particular example, parser 22 is responsible for selectively invoking one or more of transcode service providers 24 based upon a predetermined selection criterion. With reference to FIG. 1 and FIG. 4, virus checker 5 may be implemented, for example, as a transcoding service provider 24. Persons skilled in the art will recognize, however, that the functionality of transcoding service provider 24 may also be implemented in a router, a networking stack, or any other suitable network device.

In the arrangement shown in FIG. 5, transcoding server 34 includes an HTTP (HyperText Transfer Protocol) remote proxy 36, capable of accessing network 18 over server/network communications link 16. HTTP remote proxy 36 provides functionality different from known network proxies, which generally are little more than a conduit for requests to, and replies from, external Internet resources, in that it is capable not only of examining such requests and replies, but also of acting upon commands in the requests by, for example, determining whether or not to transcode content. Moreover, using transcoder 20, HTTP remote proxy 36 is capable of changing content received from network 18 prior to returning it to a requesting network client 12.

Looking more closely at the arrangement shown in FIG. 5, transcoder 20 is coupled to HTTP remote proxy 36. Parser 22 manages the transcoding of data to be transmitted from transcoding server 34 to network client 12. To this end, parser 22 controls transcode service providers 24 to selectively transcode content based on a predetermined selection criterion. For example, one or more transcode service providers 24 may provide the capability to compress and/or scale different types of data content, such as image, video, or HTML (HyperText Markup Language), in addition to providing the virus checking functionality as discussed above. Transcoding server 34 may also include a server-side cache memory 30 managed by a server-side cache interface 28. Server-side cache memory 30 may be used to store both original and transcoded versions of content for later transmission to network client 12 without the need to re-retrieve the content from network 18 or to re-transcode the content.

Parser 22 may comprise a relatively simple, uniform interface to HTTP remote proxy 36, and may provide an API (Application Programming Interface) for transcoding data received by HTTP remote proxy 36. Parser 22 manages one or more transcode service providers 24 that are accessed through a common SPI (Service Provider Interface). In this particular implementation, parser 22 is designed in compliance with the Windows Open Systems Architecture (WOSA), and may be implemented as a Win32 DLL (Dynamic Link Library). The WOSA architecture, described in *Readings on Microsoft Windows and WOSA* (Microsoft Corp. 1995), enables additional transcode service providers 24 to be dynamically added to the system to provide new features and/or better transcoding algorithms, while at the same time not requiring changing or retesting other software components in the system.

Like parser 22, server-side cache interface 28 may be modeled after a standard Get/Set interface. Server-side cache memory 30 essentially "owns" all cached objects, in that it manages the properties and storage of the objects and may invalidate any non-locked object at any time; however, the actual format of any given cached object is known only by parser 22 and its associated transcode service providers 24. Thus, for data integrity and transcoding efficiency purposes, all access to server-side cache memory 30 in this arrangement is through parser 22.

In operation, transcoder 20 may use a Read( ) call to read data from a specified cached object data stream. For example, transcode service provider 24 may invoke this call and tunnel stream data through HTTP remote proxy 36 directly to network client 12. Similarly, a Write( ) call may be used to cache data from a new HTTP data stream. This call will append an incoming data stream received from, for example, a Web server or transcode service provider 24, to an opened cache stream which may be concurrently read using the Read( ) call.

Parser 22 may be configured to include the following calls:

```
GetObject(URL,InParams,&OutParams,&OutStream, . . . );
GetScaledObject(URL,InParams,&OutParams,&OutStream,Stage, . . . );
PutObject(URL,InParamStruct,&InStream,&OutParams,&OutStream,
. . . ).
```

Parser 22 may use such calls to manage the provision of requested content to network client 12. For example, the GetObject( ) call may be used to service non-enabled client requests, and returns a non-transcoded (original) version of a specified hypertext object. In this arrangement, transcoding server 34 assumes that each HTTP request has a unique thread that may be blocked until the request is satisfied. Accordingly, the GetObject( ) call will block until it either returns the requested data stream or indicates failure with a cause (e.g., object does not exist). This ability to return a so-called standard hypertext object is advantageous for compatibility reasons, enabling embodiments of the present invention to be used with existing browsers that do not include support for certain transcoding functionality (e.g., advanced data compression), and enabling users to selectively retrieve non-transcoded versions.

The GetScaledObject( ) call is similar to GetObject( ), and is also used to request an object from server-side cache memory 30; however, it adds support for requesting a particular version of that object, such as a high-quality rendition. Unlike traditional caching proxies, transcode service providers 24 can use server-side cache memory 30 to store several different versions of an object to support clients with different communications and/or presentation capabilities. Thus, an additional "Stage" parameter may be used to indicate which version of the cached object is to be returned to network client 12. Where transcode service provider 24 is configured to scale network content, it may use this parameter to request a version of a cached object having, for example, a default scaled quality, a refinement to a better-quality version, or the original non-scaled version.

In this particular arrangement, when network client 12 requests a hypertext object, HTTP remote proxy 36 uses either the GetObject( ) or GetScaledObject( ) call (depending on if network client 12 is capable of receiving scaled/transcoded datatypes) to retrieve the hypertext object from parser 22. If the hypertext object is not found, parser 22 uses the CreateEntry( ) call to create an entry (in effect, a placeholder) in server-side cache memory 30 for the new object. The new entry is returned to HTTP remote proxy 36, which requests the hypertext object from network 18. As a data stream for the hypertext object is returned, HTTP remote proxy 36 calls parser 22 using the PutObject( ) call, passing into this call the new entry and the handle to the data stream to be placed into the entry. Parser 22 selects an appropriate transcode service provider 24 based, for example, on the content type of the data stream. In this context, the term content type encompasses a datatype, an HTTP MIME (Multipurpose Internet Mail Extensions) type, a content format, and so on. The selected transcode service provider 24 uses a separate thread to read the incoming data stream, transcode it (for example, scan for predetermined content and delete it if found), and place it within the entry of server-side cache memory 30. The current thread immediately returns to HTTP remote proxy 36, which once again calls GetScaledObject( ) (or GetObject( )). This case will always result in a cache hit. This thread then works simultaneously with the separate thread in the PutObject( ) to tunnel data (either original or transcoded) from transcoding server 34 to network client 12.

Embodiments of the present invention may be distributed, for example, as a set of instructions residing on a storage medium. Such a storage medium might be a memory of a computer; a piece of firmware; a portable storage device, such as a diskette or other magnetic storage device, or a CD-ROM; or any other medium on which it is known to store executable instructions.

Although the present invention has been largely described with reference to embodiments for processing requests for data from the Internet, persons skilled in the art will recognize that it is equally applicable to other networking environments. For example, embodiments of the present invention may be used to scan files transmitted between devices over an intranet (typically a secure corporate network), or in an ISP environment where dial-up users get access to the network operated by an independent service provider. In such environments, network requests generated by users (either all users or a select group) that require secure access are forced to go through a virus checker such as that disclosed herein in a manner similar to what is currently done for setting up firewall proxies. Existing technology, such as router filters, may be used for this purpose. Such an arrangement is beneficial in that it provides increased safety from infected network data.

The foregoing is a detailed description of particular embodiments of the present invention. The invention embraces all alternatives, modifications and variations that fall within the letter and spirit of the claims, as well as all equivalents of the claimed subject matter. For example, the virus checking functionality may be distributed between a client device and a network device, or distributed among a plurality of network devices. Likewise, virus checking may be provided as one of a number of different transcoding-related services dynamically provided by a network proxy or similar device. Persons skilled in the art will recognize from the foregoing detailed description that many other alternatives, modifications and variations are possible.

What is claimed is:

1. A method for virus checking a data object to be downloaded to a client device, said method being implemented on a network device coupled to the client device by a communications link, said method comprising the steps of:

retrieving a data object to be downloaded to the client device;

scanning the data object for a computer virus; and downloading the data object to the client device if no computer virus is detected, wherein the data object is segmented into a series of contiguous portions, said retrieving, scanning and downloading steps being performed for each of said contiguous portions.

2. The method of claim 1, further comprising the step of returning an error to the client device if a computer virus is detected.

3. The method of claim 1, wherein the network device is coupled to a server device, said method further comprising the step of returning an error to the server device if a computer virus is detected.

4. The method of claim 1, further comprising the step of withholding at least a segment of one of said contiguous portions from the client device until all of said contiguous portions of the data object have been scanned.

5. The method of claim 4, wherein absence of said withheld segment has a sufficient magnitude to cause the client device to interpret the data object as incomplete.

6. The method of claim 4, wherein the client device includes a timeout mechanism for terminating the communications link if no activity is detected for a predetermined period of time, said method further comprising the step of extending said predetermined period of time to avoid a timeout while the network device is virus checking the data object.

7. The method of claim 6, wherein said timeout mechanism comprises a protocol stack timer, said step of extending said predetermined period of time comprising a desensitization of said protocol stack timer.

8. The method of claim 7, wherein said desensitization is achieved by introducing a progressively greater delay into the download of each of said series of contiguous portions.

9. The method of claim 1, further comprising the step of repairing the data object prior to downloading it to the client device if a computer virus is detected.

10. A network device for virus checking a data object to be downloaded to a client device, said network device comprising a computer programmed to:

retrieve a data object to be downloaded to the client device;

scan the data object for a computer virus; and download the data object to the client device if no computer virus is detected, wherein the data object is segmented into a series of contiguous portions, said retrieval, scan and download being performed for each of said contiguous portions.

11. The network device of claim 10, wherein said network device comprises a proxy.

12. The network device of claim 10, wherein the computer is programmed to perform the additional step of repairing the data object prior to downloading it to the client device if a computer virus is detected.

13. The network device of claim 10, wherein the computer includes a cache storage, said computer being further programmed to perform the steps of:

retrieving a cached version of the data object if one resides in the cache storage; and storing a version of the data object in the cache storage if no computer virus is detected.

14. The network device of claim 13, wherein said version of the data object stored in the cache storage identifies a computer virus for which the data object was scanned.

15. The network device of claim 13, wherein said computer is further programmed to perform the step of storing a repaired version of the data object in the cache storage.

16. The network device of claim 10, wherein said network device comprises a router.

17. A storage medium containing a set of instructions for execution by a network device coupled to a client device, said set of instructions comprising instructions for:

retrieving a data object to be downloaded to the client device;

scanning the data object for a computer virus; and downloading the data object to the client device if no computer virus is detected, wherein the data object is segmented into a series of contiguous portions, said retrieving, scanning and downloading being performed for each of said contiguous portions.

18. The storage medium of claim 17, wherein said storage medium comprises a magnetic storage device.

19. The storage medium of claim 17, wherein said storage medium comprises a memory accessible by the computer.

20. The storage medium of claim 17, wherein said set of instructions further comprises instructions for repairing the data object prior to downloading it to the client device if a computer virus is detected.

21. A system for virus checking network data, said system comprising a client device coupled to a network device by a communications link, wherein said network device is programmed to retrieve a data object to be downloaded to the client device, scan the data object for a computer virus, and download the data object to the client device if no computer virus is detected, the data object being segmented into a series of contiguous portions, with the retrieval, scan and download being performed for each of the contiguous portions.

* * * * *